United States Patent
Su (10) Patent No.: US 9,661,674 B2
(45) Date of Patent: May 23, 2017

(54) DUAL-SIM NETWORK SELECTION TECHNIQUES

(71) Applicant: Apple Inc., Cupertino, CA (US)

(72) Inventor: Li Su, San Jose, CA (US)

(73) Assignee: Apple Inc., Cupertino, CA (US)

(*) Notice: Subject to any disclaimer, the term of this patent is extended or adjusted under 35 U.S.C. 154(b) by 104 days.

(21) Appl. No.: 14/637,085

(22) Filed: Mar. 3, 2015

(65) Prior Publication Data

US 2016/0262200 A1 Sep. 8, 2016

(51) Int. Cl.
*H04W 76/02* (2009.01)
*H04W 52/02* (2009.01)
*H04W 8/18* (2009.01)

(52) U.S. Cl.
CPC ......... *H04W 76/025* (2013.01); *H04W 8/183* (2013.01); *H04W 52/0209* (2013.01); *Y02B 60/50* (2013.01)

(58) Field of Classification Search
None
See application file for complete search history.

(56) References Cited

U.S. PATENT DOCUMENTS

| | | |
|---|---|---|
| 2010/0304782 A1 | 12/2010 | Chang et al. |
| 2011/0269456 A1* | 11/2011 | Krishnaswamy ....... H04W 8/26 455/426.1 |
| 2012/0264425 A1 | 10/2012 | Krishnamoorthy et al. |
| 2013/0310035 A1 | 11/2013 | Gouriou et al. |
| 2014/0038607 A1* | 2/2014 | Makharia .......... H04W 36/0011 455/436 |
| 2014/0141839 A1* | 5/2014 | Larsson ................. H04W 8/20 455/558 |
| 2015/0141012 A1* | 5/2015 | Ramkumar ....... H04W 52/0209 455/435.3 |

(Continued)

OTHER PUBLICATIONS

"3rd Generation Partnership Project; Technical Specification Group Core Network and Terminals; Non-Access-Stratum (NAS) functions related to Mobile Station (MS) in idle mode"; 3GPP, 46 pages; Technical Specification No. 3GPP TS 23.122 V13.0.0; 3GPP, Valbonne, France; Dec. 2014.

(Continued)

*Primary Examiner* — Eunsook Choi
(74) *Attorney, Agent, or Firm* — Meyertons Hood Kivlin Kowert & Goetzel, P.C.; Jeffrey C. Hood; Michael B. Davis (57) ABSTRACT

Techniques are disclosed relating to operating multi-SIM mobile devices. In some embodiments, a UE comprises at least first and second SIMs where the first SIM is configured to communications via a home network or one or roaming networks and the second SIM is configurable for communications via local networks other than the home network. In these embodiments, the UE is configured to execute a first protocol stack for communications using the first SIM via a home network or a roaming network. In these embodiments, the UE is further configured to search for available networks for the second SIM using the first protocol stack and select an available local network for the second SIM using the first protocol stack. This may reduce power consumption and/or improve communication quality during the search, in some embodiments.

17 Claims, 6 Drawing Sheets

(56) References Cited

U.S. PATENT DOCUMENTS

| | | | | |
|---|---|---|---|---|
| 2015/0382285 A1* | 12/2015 | Anand | .............. | H04W 36/0061 |
| | | | | 455/436 |
| 2016/0119039 A1* | 4/2016 | Soliman | ................ | H04W 88/06 |
| | | | | 455/553.1 |
| 2016/0134316 A1* | 5/2016 | Mohan | .................... | H04W 8/22 |
| | | | | 455/558 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode"; 37 pages; Technical Specification No. 3GPP TS 36.304 V12.3.0; 3GPP, Valbonne, France; Dec. 2014.

* cited by examiner

DUAL-SIM NETWORK SELECTION TECHNIQUES

TECHNICAL FIELD

The present application relates to wireless devices, and more particularly to techniques for operating a wireless device such as a Dual SIM Dual Standby (DSDS) wireless device.

DESCRIPTION OF THE RELATED ART

Wireless communication systems are rapidly growing in usage. Further, wireless communication technology has evolved from voice-only communications to also include the transmission of data, such as Internet and multimedia content. In order to enable their wireless device to access a wireless communication network (e.g., a cellular telecommunication network) which provides such services, a user may in some cases be required to subscribe to a service provider (a "carrier"), who in turn may provide such services to the user, e.g., via a wireless communication network which they operate.

Such subscribers in a wireless communication network are typically assigned subscriber identity information, which may for example be stored using a subscriber identity module (SIM) in the subscriber's wireless device. For example, a commonly-used type of subscriber identity information is an International Mobile Subscriber Identity (IMSI), which identifies a subscriber's wireless device in their carrier's network. For subscribers to roam outside of their home network, their carrier may negotiate roaming agreements with other network operators so the visited network recognizes the subscriber's identity and allows roaming to proceed.

A user equipment device (UE), e.g., a wireless device such as a cellular phone, may be capable of using multiple SIMs. For example, a Dual SIM Dual Standby (DSDS) UE may comprise a single transmitter that may be shared between SIMs and one or more receivers. In some UEs, one SIM may be a "home SIM" configured to communicate via a home network or roaming networks (e.g., based on roaming agreements between carriers). In these UEs, the other SIM may be a configurable SIM that is programmable with subscriber identity information to communicate on local networks other than the home network. For example, a user that is travelling may be presented with the option to purchase service via another carrier, which may allow the user to download subscriber information for the carrier and communicate on the carrier's network as if it was a local network, rather than a roaming network. U.S. Pat. Appl. Pub. No. 2014/0099916 filed Oct. 10, 2012 and titled "Location-based Update of Subscriber Identity Information in a Wireless Device," for example, describes exemplary techniques for configuring a SIM to communicate using a local network other than a home network. In some situations, to reduce communication costs, the home SIM is used on a roaming network for circuit-switched (CS) communications while the configurable SIM is used on a local network (which may or may not be the same network as the roaming network) for packet-switched (PS) communications.

In various situations, a UE may execute a protocol stack for each SIM, which may increase power consumption. For example, each stack may independently schedule public land mobile network (PLMN) scans and neighbor cell detection and measurements, effectively doubling the power consumption for these actions relative to single-SIM devices. Power consumption is typically a key performance indicator for UEs, especially in idle mode. Further, limits on the complexity of protocol stacks may be imposed based on hardware and/or power limitations, when multiple protocol stacks are executed at once. Therefore, improvements in the field are desired.

SUMMARY

Embodiments described herein relate to a user equipment device (UE) and associated methods for operating dual-SIM devices.

In some embodiments, a UE comprises at least one antenna, at least one transmitter, at least one receiver, first and second SIMs, and one or more processors. In these embodiments, the first SIM is configured to communications via a home network or one or roaming networks and the second SIM is configurable for communications via local networks other than the home network. In these embodiments, the UE is configured to execute a first protocol stack for communications using the first SIM via a home network or a roaming network. In these embodiments, the UE is further configured to search for available networks for the second SIM using the first protocol stack and select an available local network for the second SIM using the first protocol stack. In these embodiments, the UE is configured to communicate via the home network or a roaming network using the first SIM and communicate via the selected local network using the second SIM.

In some embodiments, the UE is configured to activate, subsequent to selecting the available local network for the second SIM, a second protocol stack for communications using the second SIM via the local network. In some embodiments, the first protocol stack is a full multi-mode protocol stack, the second protocol stack is not a full multi-mode protocol stack, and the one or more processors are configured to execute at most one full multi-mode protocol stack at a time.

In some embodiments, a method includes executing a first protocol stack for communications using a first SIM via a home network or a roaming network. In these embodiments, the method further includes searching, for available networks for a second SIM using the first protocol stack, and the second SIM is configurable for communications via local networks other than the home network. In these embodiments, the method further includes selecting an available local network for the second SIM and communicating via the home network or a roaming network using the first SIM and the first protocol stack and communicating via the selected local network using the second SIM and a second protocol stack.

In some embodiments, a non-transitory computer-readable medium stores instructions that are executable by a computing device to perform various operations. In these embodiments, the operations include executing a first protocol stack for communications using a first SIM, searching for available networks for a second SIM using the first protocol stack where the second SIM is configurable for communications via local networks, selecting an available local network for the second SIM, communicating via using the first SIM and the first protocol stack, and communicating via the selected local network using the second SIM and a second protocol stack.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

This specification includes references to "one embodiment," "an embodiment," and/or "some embodiments." The appearances of these phrases do not necessarily refer to the same embodiment(s). Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION OF THE EMBODIMENTS

Figure 6:
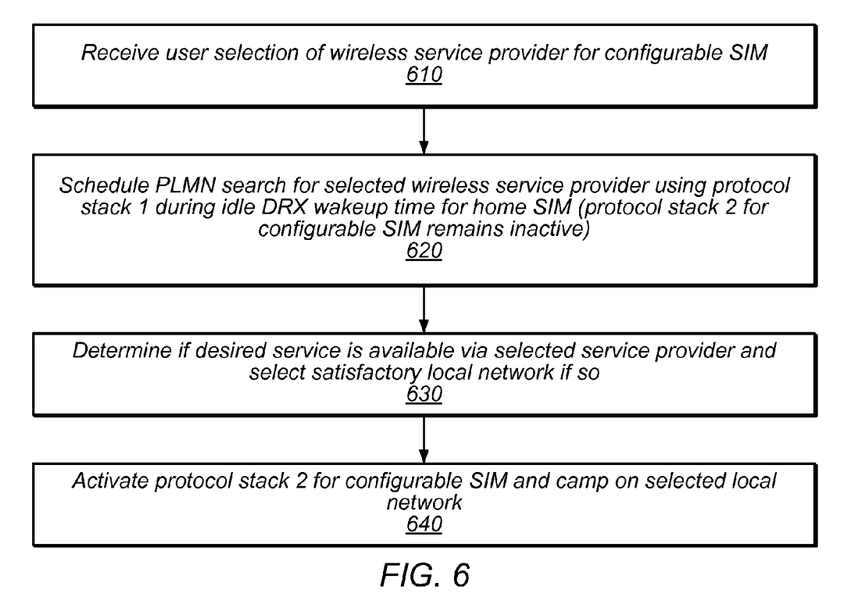
FIG. 6 is a flow diagram illustrating an exemplary method for camping on a user-selected local network, according to some embodiments.
Figure 7:
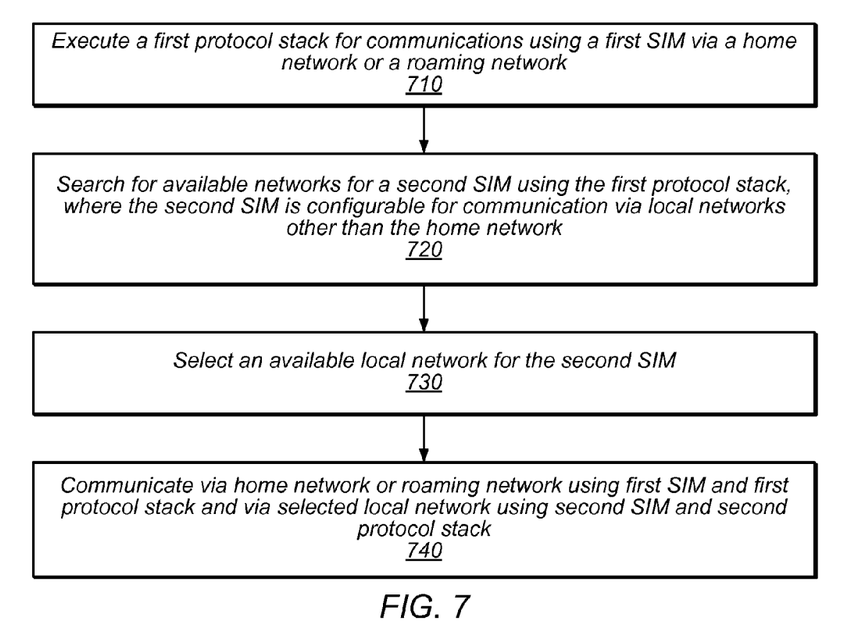
FIG. 7 is a flow diagram illustrating an exemplary method for communicating using a configurable SIM, according to some embodiments.

This disclosure initially lists relevant acronyms and a glossary. It then describes, with reference to FIGS. 1-5, an exemplary mobile device configured to communicate using multiple Subscriber Identity Modules (SIMs) and different radio access technologies (RATs). Exemplary methods for communicating using multiple SIMs (including at least one configurable SIM) are shown in FIGS. 6-7. In some embodiments, a mobile device is configured to use a protocol stack for one SIM to perform network search/selection procedures for another SIM. For example, a protocol stack executing for a home SIM may be used to perform PLMN selection for a configurable SIM. In some embodiments, this may reduce power consumption and/or allow the protocol stack to remain in a multi-RAT mode, which may improve users' communication experience.

ACRONYMS

The following acronyms are used in the present disclosure.
3GPP: Third Generation Partnership Project
3GPP2: Third Generation Partnership Project 2
CDMA: Code Division Multiple Access
DSDA: Dual SIM Dual Active
DSDS: Dual SIM Dual Standby
GSM: Global System for Mobile Communications
LTE: Long Term Evolution
PLMN: Public Land Mobile Network
RAT: Radio Access Technology
RX: Receive
SIM: Subscriber Identity Module
TX: Transmit
UE: User Equipment
UMTS: Universal Mobile Telecommunications System

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
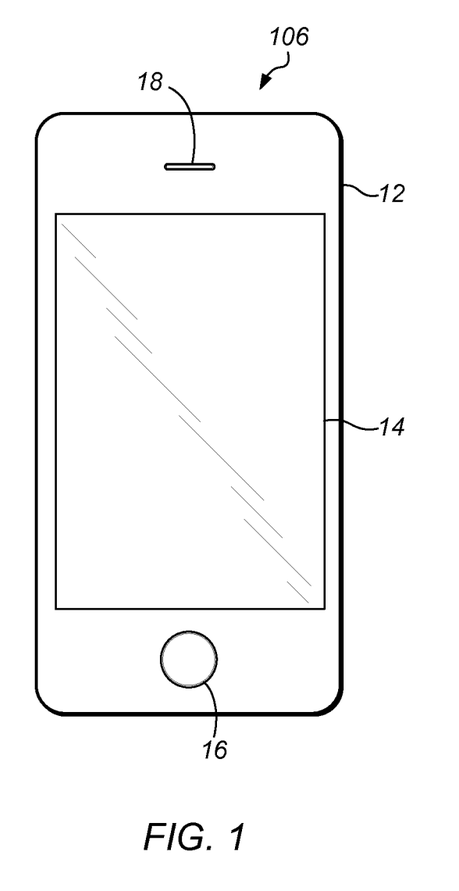
FIG. 1 illustrates an example user equipment (UE) according to some embodiments.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced (LTE-A), and/or other RATs. For example, the UE 106 may support at least two radio access technologies such as LTE and GSM. Various different or other RATs may be supported as desired.

The UE 106 may comprise at least two antennas. The UE 106 may also comprise any of various radio configurations, such as various combinations of one or more transmitter chains (TX chains) and two or more receiver chains (RX chains). For example, the UE 106 may comprise two radios that may each support one or more RATs. The two radios may each comprise a single TX (transmit) chain and a single RX (receive) chain. Alternatively, the two radios may each comprise an RX chain and may share a single TX chain.

In the embodiment described herein, the UE 106 comprises two antennas, which communicate using two or more RATs. For example, the UE 106 may have a pair of cellular telephone antennas, where each antenna is coupled to a respective single radio. Where two radios share a single TX chain, the antennas may be coupled to the shared portions of the radios (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The second antenna may also be coupled to the first TX chain. The first and second receiver chains may be independent in frequency to allow for simultaneous voice calls on each of the two radios. The first and second receiver chains may additionally share a common local oscillator, which means that both of the first and second receiver chains are capable of tuning to the same frequency.

In some embodiments, each radio may time multiplex among two or more RATs, such as LTE and one or more other RATs such as GSM or CDMA1×. In the primary embodiment described herein the UE 106 comprises one transmitter chain and two receiver chains.

Each antenna may receive a wide range of frequencies such as from 600 MHz up to 3 GHz. Thus, for example, the local oscillator of one receiver chain may tune to a specific frequency such as an LTE frequency band. The wireless circuitry in the UE 106 can be configured in real time depending on the desired mode of operation for the UE 106. In the example embodiment described herein, the UE 106 is configured to support LTE, W-CDMA (W), TDS-CDMA (T) and GSM (G) radio access technologies. In some embodiments, the UE 106 comprises two or more subscriber identity modules (SIMs), which each support one or more RATs.

Figure 2:
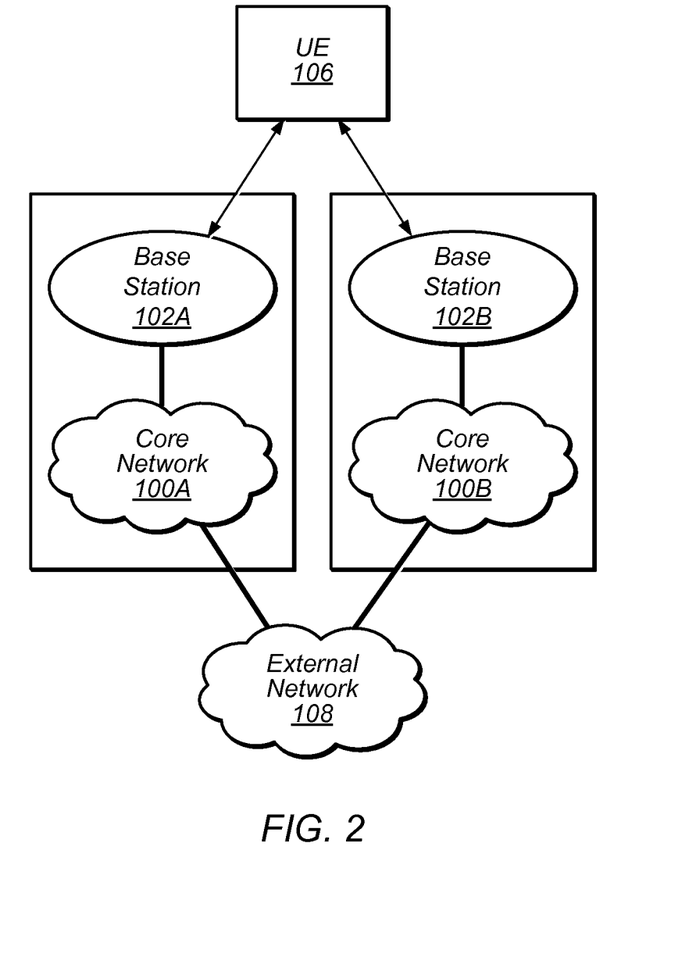
FIG. 2 illustrates an example wireless communication system in which a UE communicates with two base stations.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various RATs (also referred to as wireless communication technologies or telecommunication standards), such as LTE, W-CDMA, TDS-CDMA, and GSM, among possible others such as UMTS, LTE-A, CDMA2000 (e.g., 1×RTT, 1×EV-DO, HRPD, eHRPD), etc.

Base station 102A and core network 100A may operate according to a first RAT (e.g., LTE) while base station 102B and core network 100B may operate according to the same RAT or a second (e.g., different) RAT (e.g., GSM). The two core networks may be controlled by the same network operator (e.g., cellular service provider or "carrier"), or by different network operators, as desired. In addition, the two core networks may be operated independently of one another (e.g., if they operate according to different RATs), or may be operated in a somewhat coupled or tightly coupled manner.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
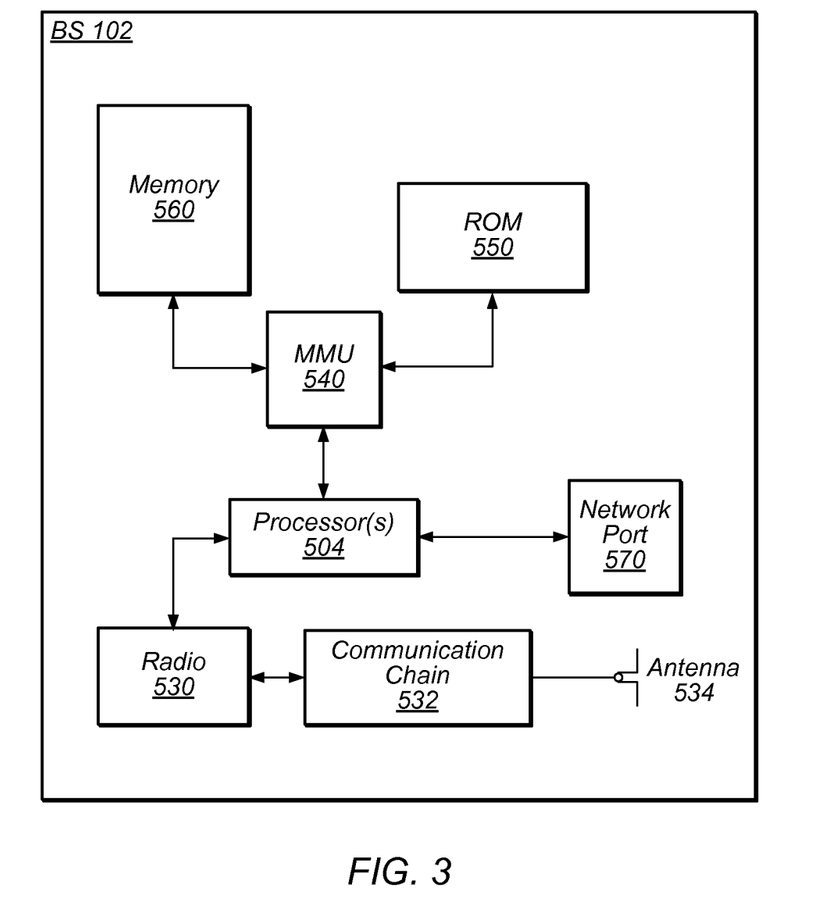
FIG. 3 is an example block diagram of a base station, according to some embodiments.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
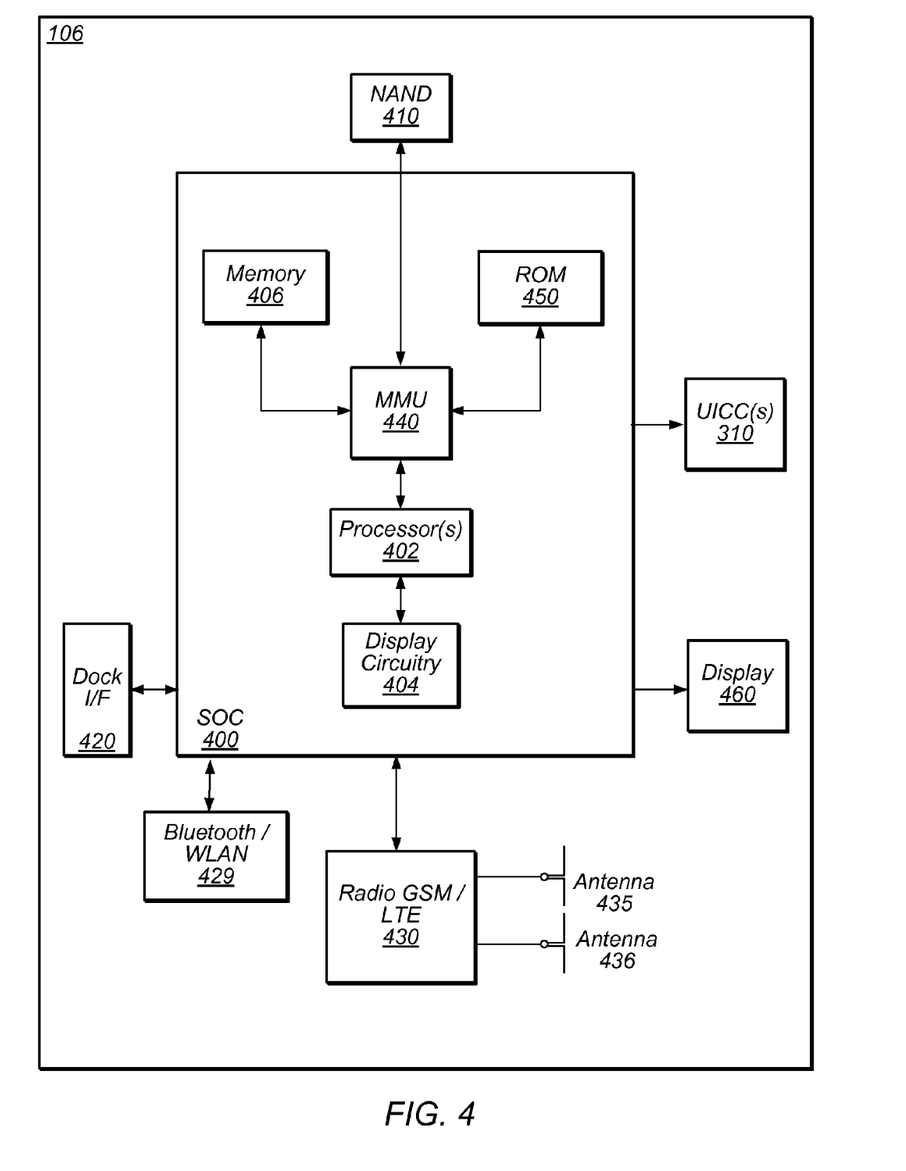
FIG. 4 is an example block diagram of a UE, according to some embodiments.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further comprise two or more smart cards 310 that each comprise SIM (Subscriber Identity Module) functionality, such as two or more UICC(s) (Universal Integrated Circuit Card(s)) 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In some embodiments, as noted above, the UE 106 comprises at least one smart card 310, such as a UICC 310, which executes one or more Subscriber Identity Module (SIM) applications and/or otherwise implements SIM functionality. In some embodiments, UE 106 includes two or more smart cards 310. Each SIM smart card 310 may be embedded, e.g., may be soldered onto a circuit board in the UE 106, or each SIM smart card 310 may be implemented as a removable smart card. Thus the smart card(s) 310 may be removable smart cards (such as UICC cards, which are sometimes referred to as "SIM cards"), and/or the smart card(s) 310 may be embedded cards (such as embedded UICCs (eUICCs), which are sometimes referred to as "eSIMs" or "eSIM cards"). In some embodiments (such as when the smart card(s) 310 include an eUICC), one or more of the SIM(s) 310 may implement embedded SIM (eSIM) functionality. In such embodiments, one of the smart card(s) 310 may execute multiple SIM applications. Each of the smart card(s) 310 may include components such as a processor and a memory. Instructions for performing SIM/eSIM functionality may be stored in the memory and executed by the processor. In some embodiments, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

The inclusion of two or more SIM smart cards 310 in embodiments of UE 106 may allow the UE 106 to support two different telephone numbers and may allow the UE 106 to communicate on corresponding two or more respective networks. For example, a first smart card 310 may comprise SIM functionality to support a first telephone number on the UE, and a second smart card 310 may comprise SIM functionality to support a second telephone number on the UE. Where the UE 106 comprises two smart cards 310, the UE 106 may support Dual SIM Dual Standby (DSDS) functionality. The DSDS functionality may allow the UE 106 to be connected to a first network performing a first active call and to receive a second call at the same time. Thus the DSDS functionality may allow either or both of the two smart cards 310 in the UE 106 to be on standby waiting for a voice call and/or data connection. In some embodiments of DSDS, when a call/data is established on one SIM 310, the other SIM 310 is no longer active.

As noted above, the UE 106 may be configured to communicate wirelessly using multiple radio access technologies (RATs). As further noted above, in such instances, the cellular communication circuitry (radio(s)) 430 may include radio components which are shared between multiple RATs. In some embodiments, the cellular communication circuitry 430 may comprise two distinct radios, each having a receive chain and a transmit chain. In some embodiments, the two radios may support separate RAT stacks. Additionally, or alternatively, one or more of the RAT stacks may be capable of utilizing either radio.

The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
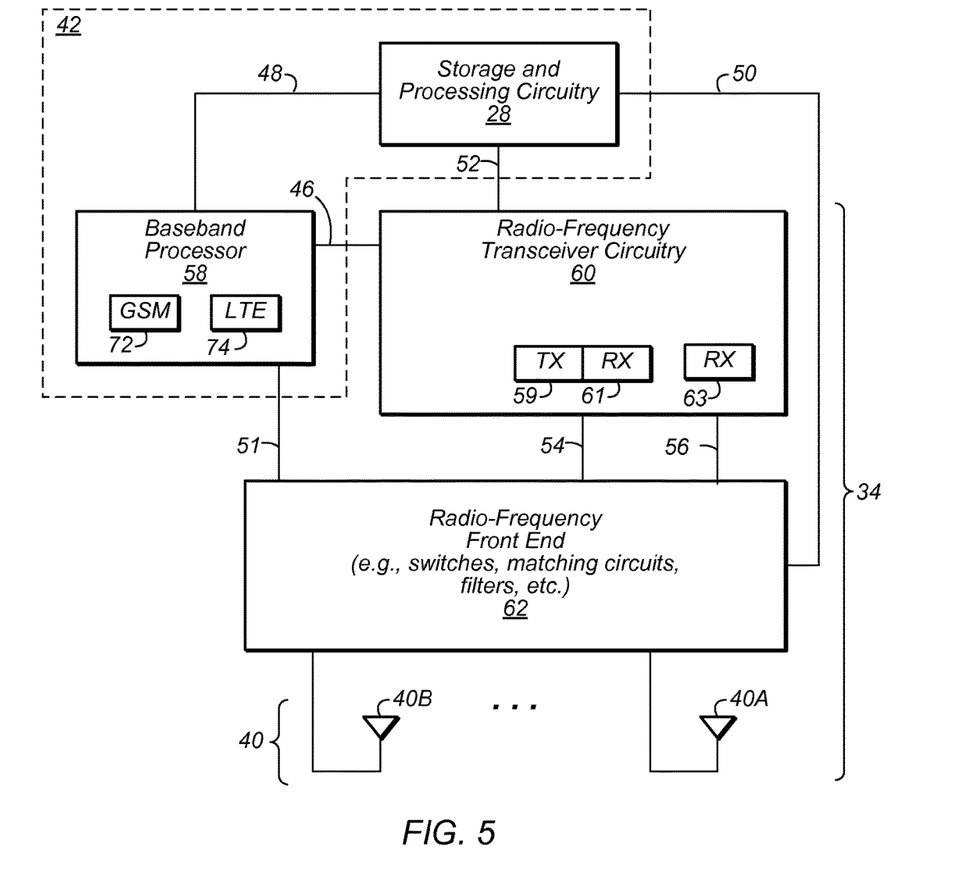
FIG. 5 is an example block diagram of wireless communication circuitry in the UE, according to some embodiments.

FIG. 5—UE Transmit/Receive Logic

FIG. 5 illustrates a portion of UE 106 according to some embodiments. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM protocol stack 72, LTE protocol stack 74, and/or 1× protocol stack (not shown), among others. In some embodiments, a given protocol stack may be a multi-mode protocol stack configured to handle multiple different RATs.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or baseband processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown, radio-frequency transceiver circuitry 60 comprises transceiver (TX) chain 59, receiver (RX) chain 61 and RX chain 63. The embodiment shown may be considered to comprise two radios, which share a single TX chain. Other embodiments are of course contemplated.

Overview of Exemplary Dual-SIM Operations

In some dual-SIM embodiments, one SIM is referred to as a "home SIM" while the other SIM is referred to as a "configurable SIM." In some embodiments, one or both of the SIMs are eSIMs. In a UE device with DR-DSDS (Dual RX-Dual SIM Dual Standby) capabilities, circuit-switched (CS) service is typically provided by the network registered with the home SIM. This network (network A) may be either a home network or a roaming network. To communicate via a roaming network, a roaming agreement with the non-home network operators may be required so that the visited network recognizes the subscriber's identity and allows roaming to proceed. In these embodiments, packet-switched (PS) service may be provided by network A using the home SIM if the configurable SIM is not active or is not registered to a network.

The configurable SIM, in some embodiments, is programmable with subscriber identity information to communicate on local networks other than the home network. For example, a user that is travelling may be presented with the option to purchase service via another carrier, which may allow the user to download subscriber information for the carrier and communicate on the carrier's network as if it was a local network, rather than a roaming network. In these embodiments, if the configurable SIM is activated and registered to another network (network B), then PS service is typically provided by network B while network A provides CS service only. This solution may benefit roaming users (e.g., by reducing fees). Because roaming PS service is typically expensive, the home SIM can use a roaming network for CS service only while the PS service can be provided by a local network using the configurable SIM with a reduced cost.

Note that a network is described as a "local network" when a subscriber identity being used to access the network is associated with the carrier that provides service via the network. Thus, if the configurable SIM is programmed with a subscriber identity associated with a carrier providing service via a network, then that network is a local network for the configurable SIM. If the home SIM's subscriber identity is used to communicate on the same network, the network would be a roaming network from the home SIM's point of view because the home SIM's subscriber information is not associated with the carrier providing the service (assuming that the network is not the "home network," which is a network provided by a carrier associated with the home SIM subscriber identity).

A "roaming network" is a network for which the relevant subscriber identity is not associated with the carrier providing service via the network. Typically, a roaming agreement has been negotiated between the carrier associated with the subscriber identity and the carrier providing service via the roaming network.

Although various embodiments described herein include a home SIM and a configurable SIM, in various other contemplated embodiments both SIMs are configurable SIMs. In these embodiments, activities described herein as performed for the "home SIM" in various disclosed embodiments may be performed for a configurable SIM that is re-configurable for communications via different carriers, but is not re-configured during performance of the disclosed techniques.

In one conventional roaming scenario, the home SIM is registered with network A and may operate in conjunction with a multi-mode protocol stack (stack 1) and an independent RF receiver (RX1). In this scenario, if network A is a roaming network, a user may wish to purchase service via a service provider for a local network and perform PS communications using the configurable SIM and the local network while performing CS communications using the home SIM.

Traditionally, network search and selection operations, for example, for the configurable SIM would be performed using a second protocol stack (stack 2). These search and selection operations may occur in response to user input (e.g., selecting a local network) or in response to changing conditions for a local network on which the configurable SIM is already communicating (e.g., when deteriorating conditions indicate that a switch to another network and/or RAT should occur). For example, the search may be used to update a PLMN list and the user may be prompted to select a different local network.

Note that different "protocol stacks" (e.g., stack 1 and stack 2) may refer to different instances of the same protocol stack or to different instances of similar protocol stacks. For example, UE 106 may store protocol stack information and use that same information to execute different protocol stack instances. As described in further detail below, in some embodiments a single instance of a protocol stack (e.g., stack 1) is executed to perform at least some operations for multiple SIMs.

Frequent shifts to different PLMNs for the configurable SIM may lead to undesirable DSDS behavior. In some embodiments, hardware performance may be limited, e.g., to conserve battery life. For example, hardware limitations for modem hardware and/or baseband processing elements may impose restrictions on multi-mode protocol stack execution. In some embodiments, at most one protocol stack can operate in full multi-mode (e.g., using ones of GSM, WCDMA, LTE, etc.) while other stacks are allowed to operate in only partial multi-mode or in single-mode. "Single-mode" refers a protocol stack mode in which communications are supported using only a single RAT (e.g., only GSM). "Full multi-mode" refers to a protocol stack mode in which an entirety of RATs that protocol stacks of a given UE are configured to support are supported. "Partial multi-mode" refers to a protocol stack mode in which more than one, but less than an entirety of RATs that protocol stacks of a given UE are configured to support are supported. For example, if a given UE is configured to support GSM, WCDMA, and LTE RATs, then a mode in which a protocol stack is configured to communicate using only GSM and LTE is partial multi-mode and a mode in which a protocol stack is configured to communicate using GSM, WCDMA, and LTE is full multi-mode.

In embodiments which restrict the number of full multi-mode protocol stacks, using stack 2 for PLMN search for the configurable SIM may result in the stack 1 for the home SIM being restricted to partial multi-mode or single-mode operation, which may reduce call quality (e.g., the UE may be unable to relocate to a different RAT, which may cause pages to be missed). Because PLMN selection or reselection may take a substantial amount of time (e.g., a few minutes), connection quality for the home SIM may deteriorate or the connection may even be lost. This may significantly degrade communication quality, especially for mobile terminating (MT) call performance.

Further, when PLMN searches are being performed for the configurable SIM using stack 2, stack 1 may be in an idle discontinuous reception (DRX) mode. The PLMN searches may involve waking up hardware (e.g., baseband processing elements and/or RF hardware), which consumes significantly more power than remaining in idle mode. This may be especially problematic when the configurable SIM frequently shifts to different PLMNs for better PS data service, for example.

DRX mode refers to a mode in which at least a portion of UE circuitry is powered down when there is no data (or voice) to be received. In DRX and connected DRX (CRDX) modes, the UE 106 synchronizes with the base station 102 and wakes up at specified times or intervals to listen to the network. DRX is present in several wireless standards such as UMTS, LTE (Long-term evolution), WiMAX, etc. The terms "DRX" and "CDRX" are explicitly intended to at least include the full extent of their ordinary meaning, and are intended to encompass similar types of modes in future standards.

Therefore, in some embodiments discussed in further detail below, stack 1 is used to perform PLMN search and/or selection procedures (e.g., using DRX wake-up cycles) using the configurable SIM's IMSI. This may allow stack 1 to remain in full multi-mode and may reduce power consumption for the search/selection for the configurable SIM, in some embodiments.

FIG. 6—Exemplary Method for Camping on a User-Selected Local Network

FIG. 6 shows one exemplary embodiment of a method for camping on a user-selected local network. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 610, UE 106 receives user selection of a wireless service provider for the configurable SIM. For example, UE 106 may present the user with a list of available PLMNs and the user may select one of the PLMNs. In some embodiments, an input module of UE 106 is configured to receive the user input, e.g., via a touchscreen, wireless or wired input device, etc. In some embodiments, the user may purchase or have already purchased coverage via the service provider. In some embodiments, UE 106 may be communicating using the configurable SIM prior to the user selection. In other embodiments, the configurable SIM may be idle prior to the user selection. In still other embodiments, the disclosed method elements may be performed automatically without user selection, e.g., based on a default configuration and/or based on past user selections.

At 620, UE 106 schedules a PLMN search for the selected wireless service provider using protocol stack 1 (the home SIM's protocol stack) during DRX wakeup time for the home SIM. In some embodiments, this search is performed using the configurable SIM's IMSI. In the illustrated embodiment, stack 2 for the configurable SIM remains inactive during the PLMN search. Exemplary PLMN selection and roaming procedures are discussed in 3GPP TS 23.122 V13.0.0 (2014-12), which is incorporated by reference herein in its entirety, at section 3.1. An exemplary PLMN selection/reselection process is also discuss in 3GPP TS 36.304 V12.3.0 (2014-12), which is incorporated by reference herein in its entirety, at section 5.1, while section 5.2 discusses exemplary cell selection/reselection procedures. 3GPP TS 36.304 also discusses exemplary DRX for paging at section 7.1

At 630, UE 106 determines if a desired service is available via the selected service provider and if so, selects a satisfactory local network. For example, UE 106 may determine that coverage meets one or more quality of service (QOS) requirements and/or that PS service is available, and select an appropriate cell for communications based on information determined during the PLMN search.

If the user-selected PLMN is not found or a connection cannot be made after a threshold number of DRX cycles, a search for the user-selected PLMN may be rescheduled for a future time to conserve battery power. In some embodiments, the search is repeated using a telescoping search pattern (e.g., the search may be repeated N1 times with an interval T1 between each time, then repeated N2 times with an interval T2 between each time, and so on, where T2 is an interval greater in length than T1 and N1 and N2 are integers). This may reduce power consumption while still allowing eventual PLMN selection if an appropriate network becomes available, e.g., based on a change in user location.

At 640, UE 106 activates protocol stack 2 for the configurable SIM and camps on the selected local network. Protocol stack 2 may execute in partial multi-mode or single-mode. Performing the PLMN selection/reselection using protocol stack 1 may allow protocol stack 1 to remain in full multi-mode throughout the process. In some embodiments, various other activities for the configurable SIM (e.g., neighbor cell detection, selection, reselection, and/or measurement) may also be scheduled during DRX wakeup time using protocol stack 1. In some embodiments, once protocol stack 2 is activated, UE 106 is configured to perform CS communications using protocol stack 1 and the home SIM and PS communications using protocol stack 2 and the configurable SIM. In various embodiments, the PLMN searches for the configurable SIM may be scheduled on a single RAT or on multiple RATs.

FIG. 7—Exemplary Method

FIG. 7 shows one exemplary embodiment of a method for communicating using a configurable SIM. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 710, UE 106 executes a first protocol stack for communications using a first SIM via a home network or a roaming network. In some embodiments, this may include using the first protocol stack to perform various operations during DRX wakeup time when the first protocol stack is in a DRX idle mode. The first protocol stack may be configured as a full multi-mode protocol stack.

At 720, UE 106 searches for available networks for a second SIM using the first protocol stack. In the illustrated embodiment, the second SIM is configurable for communication via local networks other than the home network. In some embodiments, the search is a PLMN search. In some embodiments, the search is performed in response to user selection of a PLMN. In some embodiments, the search is performed automatically. In some embodiments, the search is performed based on network conditions for communications using the second SIM.

At 730, UE 106 selects an available local network for the second SIM. The local network may be determined to be available based on the search of step 720. The local network may be selected based on a determination that the local network satisfies a desired type or level of service. In some embodiments, UE 106 is configured to activate a second protocol stack for the second SIM in response to selecting the local network. Information for the second protocol stack may be stored prior to the second protocol stack being activated. The second protocol stack may be configured as a single-mode protocol stack or a partial multi-mode protocol stack.

At 740, UE 106 communicates via a home or roaming network using the first SIM and first protocol stack and via the selected local network using the second SIM and second protocol stack. For example, the first SIM's IMSI may be used for CS communications while the second SIM's IMSI may be used for PS communications. In some embodiments, the first protocol stack is used for the first SIM and the second protocol stack is used for the second SIM, in step 740.

Embodiments described in this disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processors configured to couple to:
   at least one transmitter and at least one receiver;
   a first subscriber identity module (SIM) configured for communications via a home network or a roaming network; and
   a second SIM that is configurable for communications via local networks other than the home network; and
   wherein the apparatus is configured to:
   execute a first protocol stack for communications using the first SIM via the home network or the roaming network;
   search, using the first protocol stack and a subscriber identity of the second SIM, for available networks for the second SIM;
   select an available local network for the second SIM using the first protocol stack;
   activate a second protocol stack in response to the selection, wherein information for the second protocol stack is stored prior to the activation; and
   communicate via the home network or the roaming network using the first SIM and communicate via the selected local network using the second SIM.

2. The apparatus of claim 1, wherein the first protocol stack is a full multi-mode protocol stack, the second protocol stack is not a full multi-mode protocol stack, and the one or more processors are configured to execute at most one full multi-mode protocol stack at a time.

3. The apparatus of claim 1, wherein the UE is configured to use the first protocol stack to monitor for both circuit-switched (CS) and packet-switched (PS) paging prior to activating the second protocol stack and is configured to use the first protocol stack to monitor for CS paging and the second protocol stack to monitor for PS paging after activating the second protocol stack.

4. The apparatus of claim 1, wherein the UE is configured to search for available networks for the second SIM in response to input requesting connection to a local network.

5. The apparatus of claim 4, wherein the input specifies a particular local network.

6. The apparatus of claim 5, wherein the UE is configured to, in response to a failure to find the particular local network or a failure to connect to the particular local network, to schedule a future search for the particular local network using the first protocol stack.

7. The apparatus of claim 1, wherein the UE is configured to search for available networks and select an available network for the second SIM during discontinuous reception (DRX) wakeup time for the first protocol stack.

8. The apparatus of claim 7, wherein the UE is further configured to schedule cell detection and/or measurement activities during the DRX wakeup time.

9. The apparatus of claim 1, wherein the search is a public land mobile network (PLMN) search for a specific radio access technology (RAT) or for multiple RATs.

10. A method, comprising:
    executing a first protocol stack for communications using a first subscriber identity module (SIM) via a home network or a roaming network;
    searching, for available networks for a second SIM using the first protocol stack and a subscriber identity of the second SIM, wherein the second SIM is configurable for communications via local networks other than the home network;
    selecting an available local network for the second SIM;
    activating a second protocol stack for the second SIM in response to the selecting, wherein information for the second protocol stack is stored prior to the activating; and
    communicating via the home network or a roaming network using the first SIM and the first protocol stack and communicating via the selected local network using the second SIM and a second protocol stack.

11. The method of claim 10, wherein the first protocol stack is a full multi-mode protocol stack and wherein the second protocol stack is not a full multi-mode protocol stack.

12. The method of claim 10, further comprising:
    receiving input via an input module, wherein the input specifies a particular local network, wherein the searching is performed in response to the input.

13. The method of claim 10, further comprising:
    executing the second protocol stack for the second SIM for another local network during the searching and selecting, wherein the searching using the first protocol stack is performed in response to a change in conditions for the other local network.

14. A non-transitory computer-readable medium having instructions stored thereon that are executable by a computing device to perform operations comprising:
    executing a first protocol stack for communications using a first subscriber identity module (SIM);
    searching for available networks for a second SIM using the first protocol stack and a subscriber identity of the second SIM, wherein the second SIM is configurable for communications via local networks;
    selecting an available local network for the second SIM;
    activating a second protocol stack in response to the selecting, wherein information for the second protocol stack is stored prior to the activating; and communicating via using the first SIM and the first protocol stack and communicating via the selected local network using the second SIM and a second protocol stack.

15. The non-transitory computer-readable medium of claim 14, wherein the first protocol stack is a full multi-mode protocol stack, the second protocol stack is not a full multi-mode protocol stack, and at least one of the first and second SIMs is an embedded SIM (eSIM).

16. The non-transitory computer-readable medium of claim 14, wherein the searching is performed in response to a change in conditions for another local network for which the second SIM is used to communicated prior to the selecting.

17. The non-transitory computer-readable medium of claim 14, wherein the searching is performed in response to received input.

* * * * *